United States Patent
Szymanski

(10) Patent No.: US 6,698,617 B1
(45) Date of Patent: Mar. 2, 2004

(54) SYSTEM AND METHOD OF CHANGING A DISPOSABLE NOZZLE TIP FOR DISPENSING REACTANT MIXTURES

(75) Inventor: Richard John Szymanski, Grosse Pointe Woods, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 10/248,980

(22) Filed: Mar. 6, 2003

Related U.S. Application Data

(60) Provisional application No. 60/410,756, filed on Sep. 13, 2002.

(51) Int. Cl.[7] .............................................. B65B 59/00
(52) U.S. Cl. ............................. 222/1; 222/575; 141/84; 137/15.01; 137/315.01
(58) Field of Search ............................. 222/1, 566–570, 222/575; 141/84; 137/15.01, 15.08, 15.17, 15.18, 315.01

(56) References Cited

U.S. PATENT DOCUMENTS

| | | | | |
|---|---|---|---|---|
| 2,528,644 A | * | 11/1950 | Dunn | 141/84 |
| 4,077,441 A | * | 3/1978 | Rosen et al. | 141/1 |
| 5,339,597 A | * | 8/1994 | Naka et al. | 53/167 |
| 5,971,060 A | * | 10/1999 | Ikeda et al. | 164/488 |
| 6,387,303 B1 | | 5/2002 | Jones et al. | |

* cited by examiner

*Primary Examiner*—J. Casimer Jacyna
(74) *Attorney, Agent, or Firm*—Raymond L. Coppiellie; Brooks & Kushman, PC

(57) ABSTRACT

An automatic system and method for changing a disposable nozzle for a multiple component reactant mixture injector. A robot supports a mixing head that is used to inject a reactant mixture. The robot moves the mixing head including a shroud and the disposable nozzle to a nozzle changing station. The shroud is retained on the mixing head by a threaded collar that is unscrewed at the nozzle changing station by a nut runner. The used nozzle is ejected from the shroud, engaged by a gripper and disposed of while a new disposable nozzle is obtained from a magazine and placed in the shroud. The threaded collar reattaches the shroud to the mixing head and the mixing head is returned to operation.

15 Claims, 2 Drawing Sheets

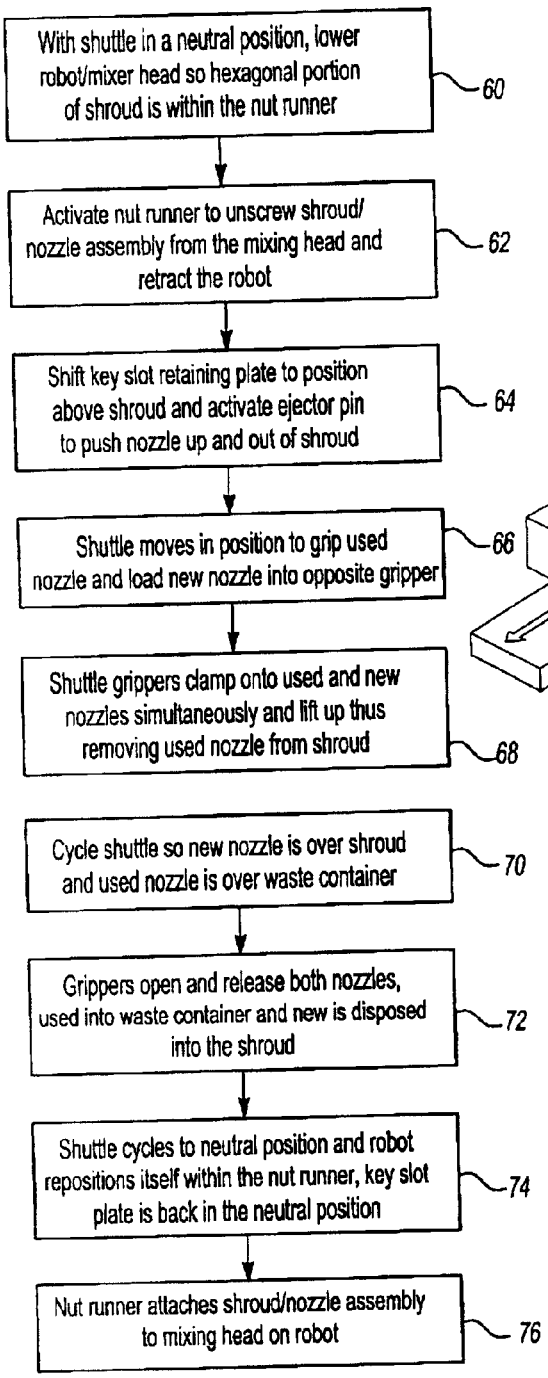

*Fig-3*

```
┌─────────────────────────────────┐
│ With shuttle in a neutral position, lower │
│ robot/mixer head so hexagonal portion     │──60
│ of shroud is within the nut runner        │
└─────────────────────────────────┘
              ↓
┌─────────────────────────────────┐
│ Activate nut runner to unscrew shroud/    │
│ nozzle assembly from the mixing head and  │──62
│ retract the robot                         │
└─────────────────────────────────┘
              ↓
┌─────────────────────────────────┐
│ Shift key slot retaining plate to position│
│ above shroud and activate ejector pin     │──64
│ to push nozzle up and out of shroud       │
└─────────────────────────────────┘
              ↓
┌─────────────────────────────────┐
│ Shuttle moves in position to grip used    │──66
│ nozzle and load new nozzle into opposite gripper│
└─────────────────────────────────┘
              ↓
┌─────────────────────────────────┐
│ Shuttle grippers clamp onto used and new  │
│ nozzles simultaneously and lift up thus   │
│ removing used nozzle from shroud          │──68
└─────────────────────────────────┘
              ↓
┌─────────────────────────────────┐
│ Cycle shuttle so new nozzle is over shroud│──70
│ and used nozzle is over waste container   │
└─────────────────────────────────┘
              ↓
┌─────────────────────────────────┐
│ Grippers open and release both nozzles,   │
│ used into waste container and new is disposed│──72
│ into the shroud                           │
└─────────────────────────────────┘
              ↓
┌─────────────────────────────────┐
│ Shuttle cycles to neutral position and robot│
│ repositions itself within the nut runner, key slot│──74
│ plate is back in the neutral position     │
└─────────────────────────────────┘
              ↓
┌─────────────────────────────────┐
│ Nut runner attaches shroud/nozzle assembly│
│ to mixing head on robot                   │──76
└─────────────────────────────────┘
```

*Fig-4*

SYSTEM AND METHOD OF CHANGING A DISPOSABLE NOZZLE TIP FOR DISPENSING REACTANT MIXTURES

CROSS REFERENCE TO RELATED APPLICATIONS

This application claims the benefit of U.S. provisional application Serial No. 60/410,756, filed Sep. 13, 2002.

BACKGROUND OF INVENTION

1. Field of the Invention

The present invention relates to a system and method for automatically changing disposable nozzle tips used to dispense multiple component reactant mixtures.

2. Background Art

Multiple component reactant mixtures are used to form polymeric compositions. Examples of polymers formed by reactant mixtures include epoxies, polyurethanes and silicon compositions. For example, silicon seals may be formed by combining a two-part reactant mixture including a catalyst component and a base component that may be mixed and injected to form the silicone seal in situ in an assembly.

Reactant mixtures are normally mixed in a mixing chamber of a gun injector that dispenses the mixture through a nozzle. The speed of the chemical reaction may depend upon the type of composition and temperature of the reactant components. If the mixture is warmed or is not dispensed through the nozzle within the time allotted, the nozzle may become clogged. For example, the reactant mixture within the nozzle may react and cure inside the nozzle if the production line is slowed or stopped.

If the nozzle clogs, an operator is called upon to change the nozzle tip. The operator must remove the clogged nozzle tip, clean the injection gun mixing chamber, and replace the disposable nozzle tip. Manual nozzle changing operations are labor intensive and may require the operator to change the nozzle in close quarters. As with any manual service operation, the effectiveness and efficiency may vary from operator to operator.

Before Applicant's invention, there was a need for a fully automated system and method of changing a disposable nozzle tip for a reactant mixture dispensing gun. Problems associated with the prior art as noted above and other problems are addressed by Applicant's invention as summarized below.

SUMMARY OF INVENTION

According to the present invention a reactant material dispensing system is provided in which at least two components are combined in a dispenser having a disposable nozzle. The system includes a mixing head that receives two components under pressure from two separate sources. A mixture of the two components flows through a disposable nozzle that is received in a shroud that is detachably secured to a mixing head. A nozzle changing station is provided where the shroud and nozzle are removed as a unit from the mixing head. An ejector is provided for separating the nozzle from the shroud. A nozzle changer disposes of the clogged nozzle and replaces it with a new nozzle.

Other aspects of the invention as it relates to a reactant material dispensing system are that the two components may be a catalyst and a base that are used to form a seal, in situ, in an article manufacture. The nozzle may be an elongated plastic nozzle having a static mixing element disposed inside the nozzle. The shroud may be a rigid elongated member having an elongated cavity in which the nozzle is received. The shroud may be connected by a threaded collar to a complimentary threaded portion of the mixing head.

According to other aspects of the invention, the mixing head may be connected to a robot arm that moves the mixing head between a production station and the nozzle changing station periodically to permit changing of the nozzle. The nozzle changing station may include an ejector pin that is inserted into the shroud and contacts the nozzle to eject the nozzle from the shroud. The nozzle changing station also may include a gripper that engages a used nozzle to remove the nozzle to a disposal station. The nozzle changer may also include a second gripper that selects a new nozzle from a magazine and moves it to the shroud.

According to another aspect of the invention, a method of changing a nozzle for a reactant material dispensing machine is provided. The reactant material dispensing machine is used to dispense at least two component materials that are combined and then dispensed by a mixing head. The dispensing machine includes a nozzle that is detachably retained on the mixing head by a shroud that is selectively removable from the mixing head. The method comprises moving the mixing head to a nozzle changing station, disconnecting the shroud and nozzle from the mixing head, and ejecting the nozzle from the shroud. The used nozzle is gripped and removed from the shroud. A new nozzle is then placed in the shroud and the shroud and new nozzle are reassembled to the mixing head.

According to other aspects of the method of the present invention, the step of disconnecting the shroud and nozzle from the mixing head may include engaging the shroud with an automatic wrench such as a nut runner that disconnects a threaded collar used to secure the shroud to the mixing head. The step of ejecting the nozzle from the shroud may be performed by inserting a pin through the shroud that engages the tip of the nozzle to separate it from the shroud. The step of gripping the new nozzle may further include selecting a new nozzle from a magazine. The step of reassembling the shroud and new nozzle to the mixing head may include placing a new nozzle within the shroud and automatically turning a threaded collar that secures the shroud to the mixing head.

These and other aspects of the present invention will be better understood in view of the attached drawings and following detailed description of the illustrated embodiment below.

BRIEF DESCRIPTION OF DRAWINGS

FIG. 3 is a perspective view of part of a nozzle changing station.

FIG. 4 is a flow chart illustrating the method of automatically changing a disposable nozzle for a reactant mixture injection system.

DETAILED DESCRIPTION

Figure 1:
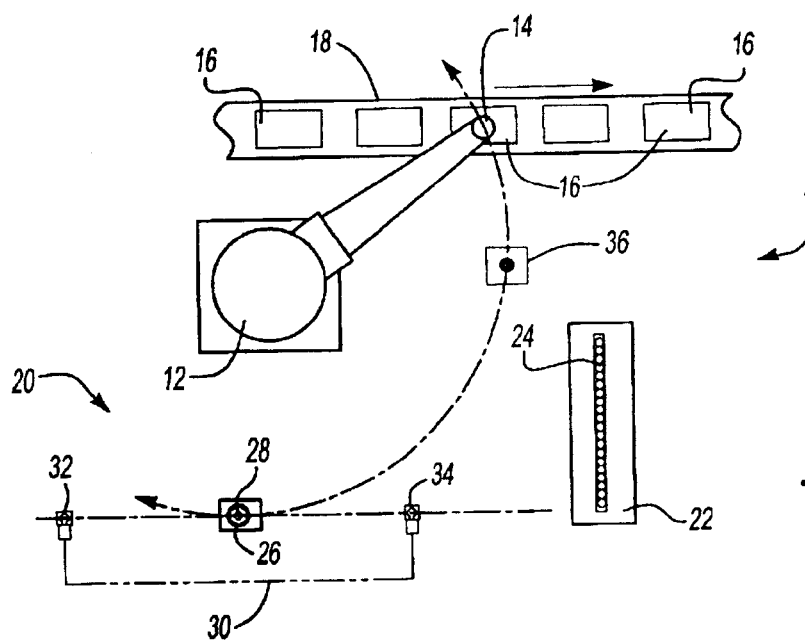
FIG. 1 is a top plan view of a robot station for injecting a reactant mixture into a part on a conveyor, the robot station features a nozzle changing station.

Referring now to FIG. 1 the multi-reactant injection system 10 is illustrated that may be used to inject a silicon sealant mixture on a production line. The system 10 uses a robot 12 to which a mixing head 14 is attached. The multiple component reactant mixture is injected through the mixing head into a part 16 as it is moved by a conveyor 18.

The system 10 includes a nozzle changing station generally identified by reference number 20. A magazine 22 is used for storage of disposable nozzles 24. The nozzle changing station 20 also includes a nut runner 26 that is used to change nozzles 24 as will be more fully described with reference to FIG. 2 below.

An ejector pin 28 ejects the nozzles 24 after a period of use or after a signal is received to change the nozzle. A shuttle 30 is provided with a first gripper 32 that removes a used nozzle 24 after it is ejected by the ejector pin 28 and carries the used nozzle 24 to a waste container (not shown).

A chiller 36 is provided as part of the system 10. The robot 12 is programmed to move the mixing head 14 to the chiller 36 and insert the nozzle 24 inside the chiller 36. By holding the nozzle 24 in chiller 36, the reaction time of the multi-component reactant 10 may be slowed to substantially reduce the rate at which the catalyst cures with the base reactant material.

Figure 2:
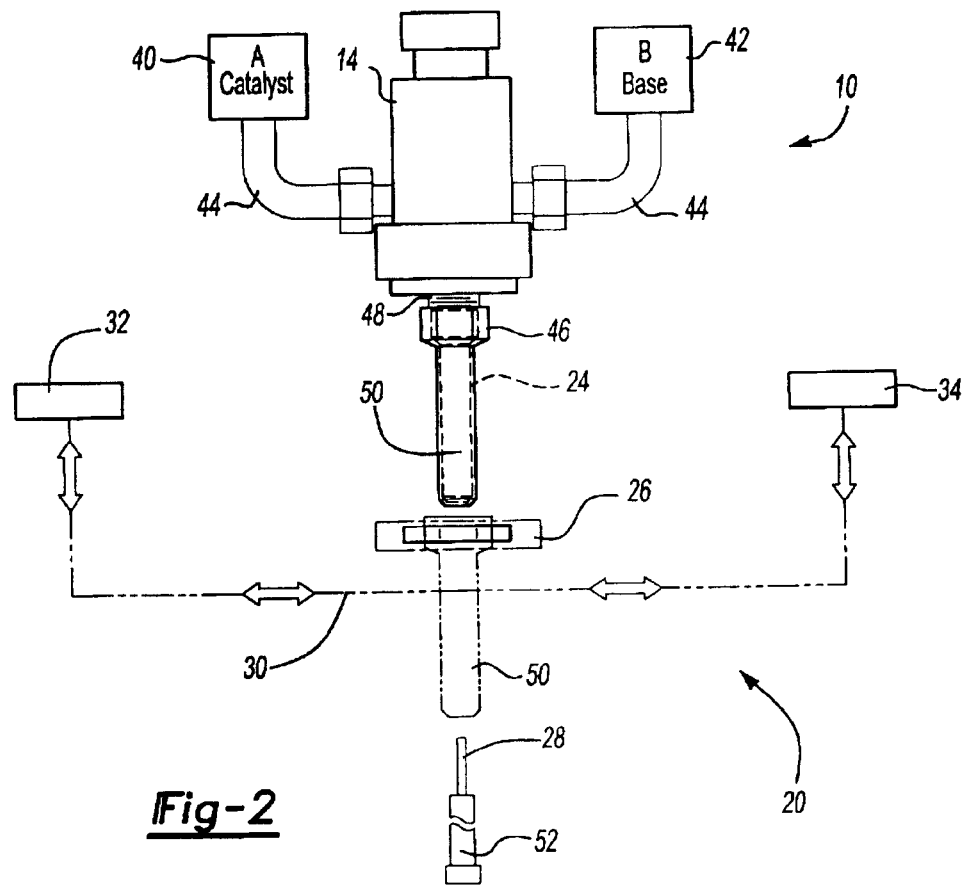
FIG. 2 is a schematic front elevation view of a reactant mixture injection system with an automatic nozzle changing system.

Referring now to FIG. 2, the multi-reactant injection system 10 is shown in greater detail. A catalyst supply 40 and the base supply catalyst 42 provide two reactant components to the mix head 14 through conduits 44. A collar 46 is received on a threaded shaft 48 that extends from the mixing head 14. The collar 46 engages a shroud 50 that houses the nozzle 24. During the nozzle changing process the collar 46 is selectively removed by the nut runner 26. When the collar 46 is removed, the shroud 50 and nozzle 24 may be separated from the mixing head 14.

Referring now to FIGS. 2 and 3, after removal, ejector pin 28 is extended into the shroud 50 by a cylinder 52 to engage the nozzle 24 and lift it above the shroud 50. A retaining plate 54 has a key hole slot 56 that engages the shroud 50 while clearance is provided for moving the nozzle 24 through the key hole slot 54 when the ejector pin 28 engages the nozzle 24. After lifting, the nozzle 24 is ready to be grasped by the gripper 32, and is carried by the shuttle 30. Gripper 32 grasps the nozzle 24 and the shuttle 30 moves the nozzle 24 to a disposal station. At the same time, the second gripper 34 selects a nozzle 24 from the nozzle storage magazine 22. The gripper 34 grasps the new nozzle 24 while the shuttle 30 carries the new nozzle 24 to the shroud replacing the old nozzle 24.

One embodiment of the process of the present invention is described with reference to FIG. 4. The process begins in the first step 60 with a shuttle 30 in a neutral position. The robot 12 lowers the mixer head 14 so that a hexagonal portion of the shroud 50, or alternatively, a collar 46 is within the nut runner 26.

Next, at 62, the nut runner 26 is activated to unscrew the shroud 50 or collar 46 from the threaded shaft 48 that is provided on the mixing head 14. After the shroud 50 or collar 46 is unscrewed, the mixing head 14 may be separated from the shroud 50 and nozzle 24 and retracted away from the nozzle changing station 20 by the robot 12.

At 64, the retaining plate 54 shifts to position the small end of the key slot 56 above the shroud 50 while allowing clearance for removal of the nozzle 24. The ejector pin 28 is activated by the cylinder 52 pushing nozzle 24 separated from the shroud 50.

In the next step, at 66, the shuttle 30 moves the first gripper 32 into position to grip the used nozzle 24. At the same time, the second gripper 34 grasps a new nozzle. At 68, the first gripper 32 clamps onto the old nozzle 24 and removes the used nozzle from the shroud 50. The second gripper 34 simultaneously clamps onto the new nozzle 24 as it moves it to the shroud 50.

The process continues, at 70 with shuttle being indexed so that the new nozzle is over the shroud 50 and the used nozzle is over a waste container.

At this point, the grippers 32,34 open releasing the old nozzle into the waste container with the new nozzle being dropped into the shroud 50.

Then, at 74, the shuttle 30 may be indexed to a neutral position as the robot 12 repositions the mixing head 14 and moves the threaded shaft 48 of the mixing head 14 into engagement with the shroud 50 or collar 46.

Finally, at 76, the nut runner 26 reattaches the shroud 50 that is fitted with the new nozzle 24 to the mixing head 14 on the robot 12. The mixing head 14 with its new nozzle 24 may then be returned by the robot 12 to the conveyor 18 and production may resume.

While the best mode for carrying out the invention has been described in detail, those familiar with the art to which this invention relates will recognize various alternative designs and embodiments for practicing the invention as defined by the following claims.

What is claimed is:

1. A reactant material dispensing system wherein at least two components are combined by a dispenser having a disposable nozzle, comprising:
    a mixing head that receives the at least two components under pressure;
    a nozzle through which a mixture of the at least two components flows, the nozzle being detachably secured to the mixing head;
    a shroud in which the nozzle is received, the shroud being detachably secured to the mixing head;
    a nozzle changing station wherein the shroud and nozzle may be removed from the mixing head as a unit, the nozzle changing station having an ejector that separates the nozzle from the shroud; and
    a nozzle changer that disposes of the nozzle after it has been used and replaces it with a new nozzle.

2. The dispensing system of claim 1 wherein the two components are a catalyst and a base used to form a seal in an article of manufacture.

3. The dispensing system of claim 1 wherein the nozzle is an elongated plastic nozzle having a static mixing element disposed therein.

4. The dispensing system of claim 1 wherein the shroud is a rigid elongated member having an elongated cavity in which the nozzle is received.

5. The dispensing system of claim 1 wherein the shroud is connected by a threaded collar to a complementary threaded portion of the mixing head.

6. The dispensing system of claim 1 wherein the nozzle changing station has an ejector pin that is inserted into the shroud and contacts the nozzle to eject the nozzle from the shroud.

7. The dispensing system of claim 1 wherein the nozzle changing station has a gripper that engages a used nozzle to remove the nozzle to a disposal station.

8. The dispensing system of claim 7 wherein the nozzle changing station has a gripper that engages a new nozzle from a magazine and moves it to the shroud.

9. The dispensing system of claim 1 wherein the nozzle changing station has a gripper that engages a new nozzle from a magazine and moves it to the shroud.

10. The dispensing system of claim 1 wherein the mixing head is connected to a robot arm that periodically moves the mixing head between a production station and the nozzle changing station to permit changing of the nozzle.

11. A method of changing a nozzle for a reactant material dispensing machine that is used to dispense at least two component materials that are combined in and dispensed by a mixing head, the dispensing machine including a nozzle that is detachably retained on the mixing head by a shroud that is selectively removable from the mixing head, the method comprising:

moving the mixing head to a nozzle changing station;

disconnecting the shroud and nozzle from the mixing head;

ejecting the nozzle from the shroud;

gripping a used nozzle and removing the used nozzle from the shroud;

gripping a new nozzle and placing the new nozzle in the shroud; and reassembling the shroud and new nozzle to the mixing head.

12. The method of claim 11 wherein the step of disconnecting the shroud and nozzle from the mixing head further comprises engaging an automatic wrench that disconnects a threaded collar that secures the shroud to the mixing head.

13. The method of claim 11 wherein the step of ejecting the nozzle from the shroud comprises inserting a pin through the shroud to engage the nozzle and separate the nozzle from the shroud.

14. The method of claim 11 wherein the step of gripping the new nozzle comprises selecting a new nozzle from a magazine and placing the new nozzle in the shroud.

15. The method of claim 11 wherein the step of reassembling the shroud and new nozzle comprises activating an automatic wrench to turn a threaded collar that secures the shroud to the mixing head.

* * * * *